May 17, 1960 — J. F. P. FARRAR — 2,936,791
FLEXIBLE HYDRAULIC HOSE
Filed Sept. 21, 1955 — 2 Sheets-Sheet 1
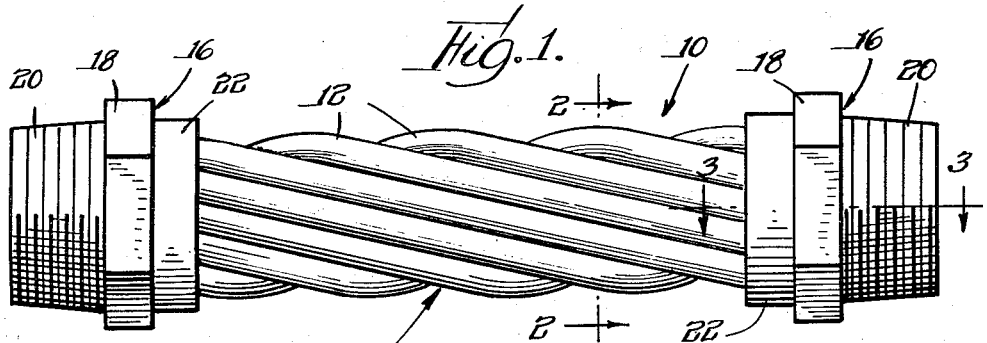
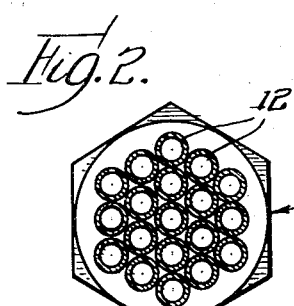
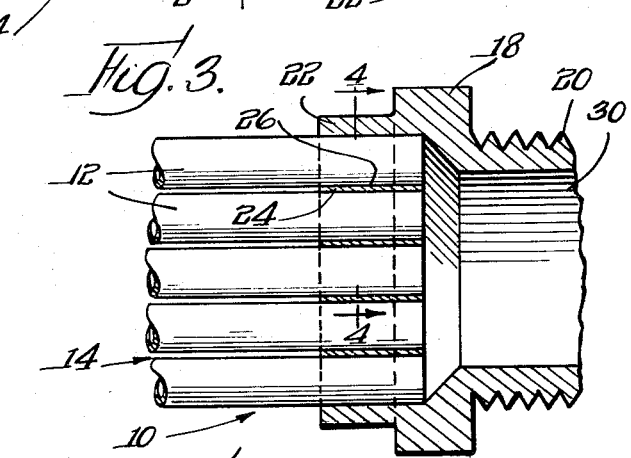
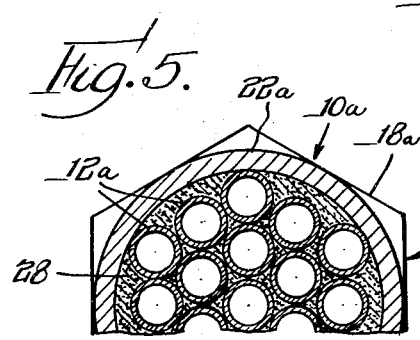
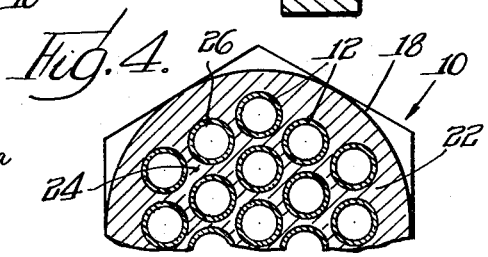
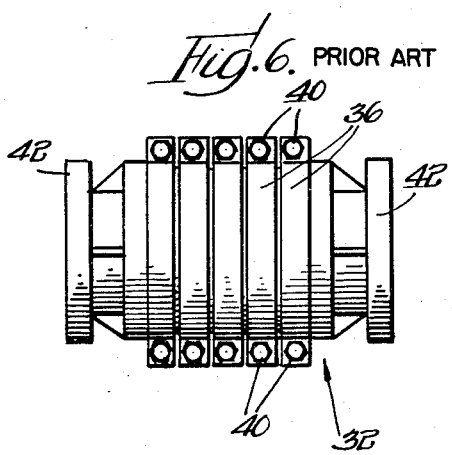
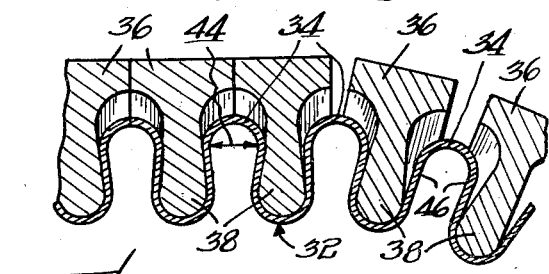
INVENTOR.
John F. P. Farrar
BY Olson & Trexler
Attys May 17, 1960 J. F. P. FARRAR 2,936,791
FLEXIBLE HYDRAULIC HOSE
Filed Sept. 21, 1955 2 Sheets-Sheet 2
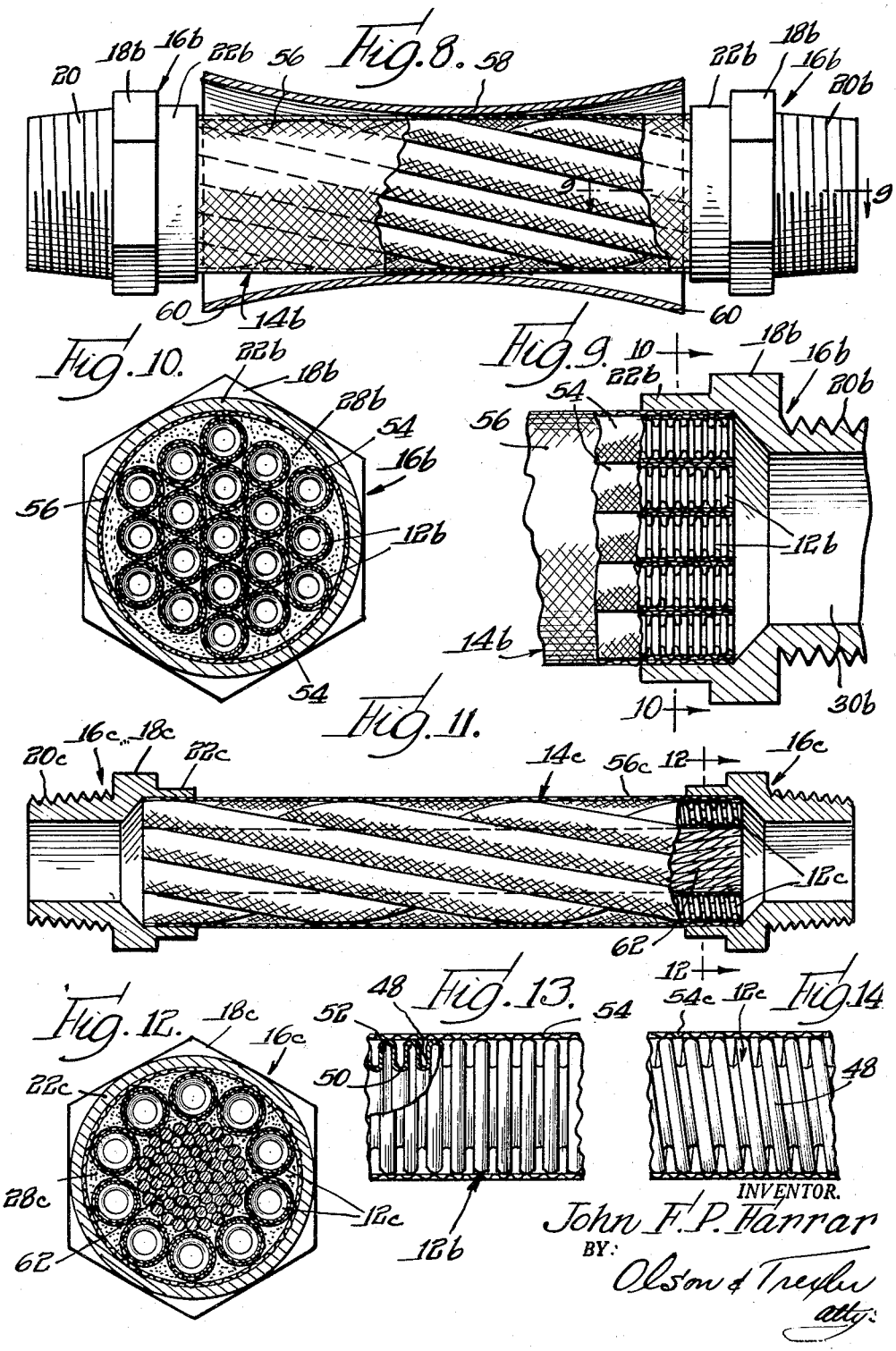
INVENTOR.
John F. P. Farrar
BY:
Olson & Trexler
attys.

United States Patent Office 2,936,791
Patented May 17, 1960

2,936,791
FLEXIBLE HYDRAULIC HOSE

John F. P. Farrar, Maywood, Ill., assignor to Flexonics Corporation, Maywood, Ill., a corporation of Illinois Application September 21, 1955, Serial No. 535,605

8 Claims. (Cl. 138—50)

This invention is concerned generally with the art of flexible hoses or the like, and specifically with a flexible hose which is adapted to higher pressures than any heretofore known, while being free to flex in use.

Transmission of hydraulic fluid at high pressures through flexible lines has presented a great many problems for a long time, and not all of these problems have been solved successfully in the past. Hoses or lines of synthetic rubber or plastic have many desirable features and for many uses have proved satisfactory. However, such hoses or lines have characteristics which militate against their use in some applications.

Corrugated metal hoses have been found satisfactory for many applications requiring flexible lines, and reinforcing rings placed in the corrugations have allowed such corrugated metal hoses to be used at high pressures. However, the reinforcing rings limit the flexibility of corrugated metal hoses, and if a reinforced corrugated metal hose is flexed to too great a degree, the wall of the hose may no longer be reinforced by one or more of the reinforcing rings, thus subjecting the hose to failure.

In addition to the normal operating pressure to be withstood by a flexible hose, such pressure being static, or dynamic, or a combination of the two, there are shock pressures that must be withstood. The flow produced by motor driven pumps causes pressure impulses or shock waves, and the sudden opening or closing of valves, such as electrically operated valves, creates shock waves in a hydraulic system. High frequency vibrations on the order of 8,000 cycles per second and up, such as often are found in machinery, and particularly in aircraft, produce shock waves which are extraordinarily detrimental to the life of flexible tubing. With such high frequency vibrations, there is no time for recoil of the hose or line material, and this causes the shock on the hose to be substantially greater than when there is time for recoil.

Accordingly, it is the broad object of this invention to provide a flexible hydraulic hose capable of withstanding steady pressures and shock pressures to a degree unknown in the prior art.

It is a further object of this invention to provide a flexible hydraulic hose having a minimum equivalent diameter, it being understood that working pressure is an inverse function of diameter.

More specifically, it is an object of this invention to provide a flexible hydraulic hose comprising a plurality of small thin-wall tubes helically wound into a single unit.

It is another object of this invention to provide a multi-tube flexible hose as in the last foregoing object incorporating structure limiting bending to a predetermined degree to preclude distorting of the tube cross sections.

Yet another object of this invention is to provide such a multi-tube, helically arranged flexible hose incorporating structure restraining the hose against twisting or elongating.

Other and further objects and advantages of the present invention will be apparent from the following description when taken in connection with the accompanying drawings, wherein:

Fig. 1 is a side view of a flexible hydraulic hose constructed in accordance with the principles of my invention;

Fig. 2 is a cross sectional viwe taken substantially along the line 2—2 of Fig. 1;

Fig. 3 is a fragmentary longitudinal sectional view through the hose and coupling as taken substantially along the line 3—3 in Fig. 1;

Fig. 4 is a cross sectional view taken through the hose and coupling substantially along the line 4—4 in Fig. 3;

Fig. 5 is a view similar to Fig. 4 showing a modified form of the invention;

Fig. 6 is a side view of a corrugated tubing expansion joint having reinforcing rings and constructed in accordance with the prior art;

Fig. 7 is an enlarged longitudinal sectional view of the expansion joint of Fig. 6;

Fig. 8 is a side view of a modified form of the invention, certain parts being broken away or shown in section;

Fig. 9 is a fragmentary longitudinal sectional view taken along the line 9—9 in Fig. 8;

Fig. 10 is a cross sectional view taken along the line 10—10 in Fig. 9;

Fig. 11 is a side view, partially in section, of a further modified form of the invention.

Fig. 12 is a cross sectional view taken along the line 12—12 in Fig. 11;

Fig. 13 is an enlarged fragmentary side view of one of the tubes comprising the hose of Fig. 8, part of the tube being shown in section; and Fig. 14 is a view similar to Fig. 13, but showing a modified form of tube as used in the hose of Fig. 11.

Referring first to Figs. 1–4, there will be seen a flexible hydraulic hose constructed in accordance with the principles of my invention and identified generally by the numeral 10. The hose comprises a plurality of thin wall tubes 12 helically wound together to form a flexible body 14. Each of the tubes 12 is flexible, and by virtue of this and of the helical disposition, the entire body 14 is flexible. The tubes in a preferred form of the invention are made of metal such as stainless steel or copper, although other metals may be used, and it is contemplated that the tubes could be made of other materials such as glass, rubber, synthetic, or plastic.

The hose 10 is provided at each end of the body 14 with a coupling 16 of suitable metal such as stainless steel or brass. Each coupling comprises a hexagonal or other noncircular section 18 for holding by a wrench, and a threaded neck or sleeve portion 20 extending therefrom. A body portion 22 extends from the wrench portion 18 in the opposite direction from the threaded neck 20. The body portion 22 initially is formed solid, thereby presenting a web 24. This web has a plurality of holes 26 bored therein. These holes are of the same diameter as the thin wall tubes 12 which might be drawn down slightly for this purpose, and are bored in regular pattern in slightly spaced relation. The holes are equal in number to the tubes, there being 19 tubes and holes in the specific embodiment. The holes are positioned in planes parallel to the faces of the wrench portion 18, and also in planes perpendicular to these faces. The ends of the tubes are inserted into the holes and are secured in place by any suitable means, such as silver brazing, brazing with other materials, soldering, or welding, or by mechanical fittings. A pressure tight joint thereby is fabricated.

A modification of the invention is illustrated in Fig. 5,

In this figure, similar numerals are utilized to identify similar parts with the addition of the suffix *a*. In this form of the invention, the web of the body portion 22a is omitted. Instead, the body portion is provided with a longitudinally extending cylindrical opening. The tubes 12a simply are inserted into this cylindrical opening, and the interstices among the tubes and between the tubes and the coupling 16a are filled with any suitable flowable material such as silver solder 28 to braze or otherwise secure the tubes in place and to form a fluid tight seal with the coupling.

It will be observed in Fig. 3 that the internal bore 30 of the threaded portion 20 of the coupling is of less diameter than the outside diameter of the body 14 of the hose, and the same is true with regard to the modification shown in Fig. 5. This is permissible inasmuch as the effective diameter of the hose body 14 is substantially less than the outside diameter of the body.

The superiority of the construction described above best will be understood with reference to a prior art reinforced corrugated hose such as is shown in Figs. 6 and 7. The metal hose in these two figures is of the corrugated type and is indicated generally by the numeral 32, the corrugations being identified by the numeral 34. Reinforcing rings 36 having radially inward projections 38 complementary to the circumferential corrugations 34, are secured about the hose. The rings 36 preferably are made in two sections and are bolted together as is indicated at 40. The hose is provided at either end with end couplings 42. This type of hose is of particular use in aligning of offset pipes.

The pressure resistance of a single tube is generally calculated by Barlows' formula:

$$P = \frac{2St}{d}$$

If the corrugated tube 32 were not reinforced, then the "*d*" in Barlows' formula would be a function of the maximum diameter of the tube. However, with the reinforcing rings in place, the critical diameter is the diameter of the "curved tube" forming the corrugations as is indicated at 44. An expansion joint, for example, by use of the reinforcing rings which support the root and side wall of the corrugation, is able to withstand approximately ten times the internal pressure that an expansion joint can withstand without such rings.

If a tube such as is illustrated at 32 is bent about a radius of fairly small diameter, then the inner portions 38 of the rings 36 move out of contact with the side walls of the corrugations 34 as is illustrated at 46. The side walls therefore no longer are supported, and the critical diameter is the maximum diameter of the corrugated tube. Thus, the pressure resistance drops enormously when such a tube is curved.

In the case of my new flexible hose 10, the effective diameter is always the diameter of each of the tubes 12. Thus, the diameter is always the same, regardless of whether the hose is arranged rectilinearly or is curved. Since the diameter of each tube is substantially on the same order as the diameter 44 of the "curved tube" of the corrugated tube, then the tube 10 can withstand substantially ten times the internal pressure of a corrugated tube when curved. The superiority of my new flexible hydraulic hose therefore should be apparent.

It will be understood that with the flexible hose as heretofore shown and described, there is a possibility that the hose might be bent to too sharp an angle, thus resulting in damage to one or more of the small tubes, such as forcing these tubes out of their normally circular cross section. Continued sharp bending might cause the tubes to break due to fatigue. Furthermore, there is a possibility that high internal pressures might tend to elongate the hose, or to cause it to tend to unwind from its helically twisted condition. A modification of the invention positively precluding any of the foregoing from occurring is illustrated in Figs. 8–10. Many of the parts are similar to those previously described, and are identified by similar numerals with the addition of the suffix *b*. To avoid prolixity of description, only the changed parts will be noted in detail.

More specifically, the flexible hose shown in Figs. 8–10 is identified by the numeral 14b and comprises a plurality of small tubes 12b. These tubes could be straight thin wall tubes of the type previously discussed. However, in this specific example they comprise corrugated tubes having folded-over wall sections 48 arranged annularly of the tubes and providing alternate sections 50 and 52 of minimum and maximum diameter. It will be understood that for flow purposes the effective diameter of each tube is slightly less than the minimum diameter 50 due to turbulence of flow in the vicinity of the corrugations or folded-over wall portions. Preferably each small tube 12b, as best seen in Fig. 13, is encircled by a tubular mesh sleeve or braid 54. This braid preferably is of metal wire but can be made of other filamentary material. It limits bending of the individual tubes 12b, it prevents the tubes from rubbing against one another due to relative movement upon bending of the hose, it protects the tubes against physical damage, it provides a physical reinforcement against high internal pressures, and it prevents unwarranted elongation of each tube.

The braid covered tubes 12b are helically twisted together as in the previous examples, and the assembly of tubes is covered with a large mesh sheath or braid 56. The braid covered hose body 14b thus produced is assembled with a pair of threaded couplings or fittings 16b similar to the fittings 16a. That is, the body portion 22b has an axial bore therethrough rather than a web having a plurality of small openings therein. The hose body 14b is inserted at each end in one of the couplings 16b and is held in place therein by a flowable material 28b hardened in place. For intsance, this can be silver braze, or some other type of solder, or a weld, or, particularly in the case of a non-metallic tube, this could be a suitable cement.

Further provision is made to limit excessive bending of the hose. This provision comprises a guard or sleeve 58 of rigid construction surrounding the hose, forming a fairly tight fit therewith at the center, and flared outwardly at the opposite ends as at 60. This guard preferably comprises a metal sleeve, but it will be understood that other materials could be used for this purpose.

A further modification of the invention is shown in Figs. 11 and 12. This embodiment of the invention is similar to that illustrated in Figs. 8–10 in that corrugated tubes 12c are utilized. The individual corrugated tubes are surrounded by braid 54c, and the hose body 14c is surrounded by braid 56c, the ends of the hose body being brazed or otherwise secured in place in fittings 16c similar to the fittings 16b.

Two points of difference are found in the hose illustrated in Figs. 11 and 12. One important feature is that there is provided a cable or rope 62 through the center of the hose body. This cable or rope preferably is made of wire for utmost strength, and serves to prevent elongation of the hose body, and also to limit bending of the hose. A further point of distinction in the embodiment of Figs. 11 and 12 lies in the individual tubes 12c. These tubes, like the tubes 12b, are corrugated, being provided with folded-over wall portions. However, the corrugations or fold-over wall portions are not annularly arranged in the same sense as in the embodiment of Figs. 8–10 (as specifically shown in Fig. 13), but as is shown specifically in Fig. 14, the corrugations 48 are helically arranged about the tube. Of course, it will be understood that the tubes could be interchanged, viz the tubes having the annular corrugations could be used with the hose having the central cable, or the tubes having the helical corrugations could be used with the hose lacking the central cable. In any event, the corrugations of either type of tube broadly comprise convolutions.

Although the braid is illustrated only in combination with the corrugated tubes, it will be understood that the braid would have use with straight walled tubes, and this is within the contemplation of the invention. Likewise, the sleeve 60 could be used with straight-walled tubes, or with the hose having a central cable, and a central cable could be used with straight-walled tubes.

Various structural modifications of the specific example herein shown and described by way of example will no doubt occur to those skilled in the art, and are to be understood as forming a part of my invention insofar as they fall within the spirit and scope of the appended claims.

I claim:

1. A hose construction comprising a plurality of small corrugated tubes wound helically together in contiguous relation, a pair of couplings, one of said couplings being joined to one end of said tubes and the other coupling being joined to the other end of said tubes, said couplings each being substantially larger than one of said tubes, a braided sleeve encircling all of said tubes and extending between said couplings, said sleeve limiting elongation of said hose construction and precluding unwinding of said tubes from their helical configuration, and a braided sleeve encircling each of said tubes.

2. A flexible hose construction comprising a plurality of thin walled flexible tubes helically wound together in the same direction and in contiguous, coterminous relation and providing a flexible hose body of predetermined overall outside diameter which is substantially uniform throughout its length and a smaller effective internal diameter, and end couplings respectively joined to opposite ends of said hose body, each of said couplings including a first section receiving an end portion of said hose body, means traversing said first section and connected therewith and to each of said tubes and individually supporting each of said tubes in the hose body, a second section adapted to be connected to a complementary member and having a bore therethrough with a diameter substantially equal to said effective internal diameter of the hose body, and integral means between said first and second sections providing a passageway connecting said hose body and said second section bore, said passageway tapering toward and to said bore and having a maximum diameter substantially at a terminal end of the hose body and substantially equal to said outside diameter of the hose body.

3. A flexible hose construction, as defined in claim 2, which includes means comprising a braid snugly surrounding the hose body for limiting bending of the hose body to prevent damage to said tubes.

4. A flexible hose construction, as defined in claim 2, which includes means comprising a cable extending longitudinally among said tubes for limiting bending of said hose body to prevent damage to the tubes.

5. A flexible hose construction, as defined in claim 2, wherein said means traversing said first section includes flowable material hardened in place.

6. A flexible hose construction, as defined in claim 2, wherein each of said tubes is corrugated substantially throughout its length.

7. A flexible hose construction, as defined in claim 6, which includes a plurality of braided sheaths respectively encircling each of said tubes and extending between and connected to said end couplings.

8. A flexible hose construction, as defined in claim 7, which includes a substantially rigid sleeve loosely disposed on the hose body between said end couplings and encircling all of said tubes and including opposite end portions flared outwardly toward free terminal ends thereof which are free of said end couplings for limiting bending of the tubes to prevent damage to the tubes.

References Cited in the file of this patent

UNITED STATES PATENTS

| | | |
|---|---|---|
| 136,952 | Austin | Mar. 18, 1873 |
| 1,044,013 | Burnett | Nov. 12, 1912 |
| 1,980,363 | Staples | Nov. 13, 1934 |
| 2,299,160 | MacPherson | Oct. 20, 1942 |
| 2,425,662 | Wolfram | Aug. 12, 1947 |
| 2,497,987 | Goode | Feb. 21, 1950 |
| 2,511,134 | Stranberg | June 13, 1950 |
| 2,578,280 | Barnard | Dec. 11, 1951 |
| 2,688,985 | Holdenreid | Sept. 14, 1954 |
| 2,787,289 | Press | Apr. 2, 1957 |

FOREIGN PATENTS

| | | |
|---|---|---|
| 17,922 | Great Britain | Oct. 9, 1900 |
| 21,381 | Great Britain | Oct. 22, 1914 |
| 627,031 | Great Britain | July 26, 1949 |
| 676,224 | Great Britain | July 27, 1952 |
| 601,094 | France | Feb. 22, 1926 |